(12) United States Patent
Johnson et al.

(10) Patent No.: US 9,919,866 B2
(45) Date of Patent: Mar. 20, 2018

(54) BOLTLESS CONTAINMENT

(71) Applicant: TrueNorth Steel, Inc., West Fargo, ND (US)

(72) Inventors: Scott Johnson, West Fargo, ND (US); Mark Kuznia, Kindred, ND (US); Scott Greelis, Moorhead, MN (US); Nick Case, Belle Fourche, SD (US); Joshua J. Artis, Fargo, ND (US)

(73) Assignee: TrueNorth Steel, Inc., West Fargo, ND (US)

( * ) Notice: Subject to any disclaimer, the term of this patent is extended or adjusted under 35 U.S.C. 154(b) by 148 days.

(21) Appl. No.: 14/186,108

(22) Filed: Feb. 21, 2014

(65) Prior Publication Data
US 2015/0239657 A1    Aug. 27, 2015

(51) Int. Cl.
| | | |
|---|---|---|
| B65D 6/00 | (2006.01) | |
| B65D 8/00 | (2006.01) | |
| B65D 6/28 | (2006.01) | |
| B65D 8/18 | (2006.01) | |
| E04H 17/18 | (2006.01) | |
| E04H 17/14 | (2006.01) | |
| E04B 2/56 | (2006.01) | |
| E04B 2/72 | (2006.01) | |
| E04B 2/74 | (2006.01) | |
| B65D 90/24 | (2006.01) | |
| B65D 90/02 | (2006.01) | |
| B65D 90/08 | (2006.01) | |
| F16B 17/00 | (2006.01) | |

(52) U.S. Cl.
CPC .......... *B65D 90/24* (2013.01); *B65D 90/023* (2013.01); *B65D 90/08* (2013.01); *F16B 17/00* (2013.01); *Y10T 29/49915* (2015.01); *Y10T 29/49922* (2015.01)

(58) Field of Classification Search
CPC ................ E04H 17/18; E04H 17/1421; E04H 2017/1421; E04B 2/56; E04B 2/72; E04B 2/7407; E04B 2/7433
USPC .............................................. 220/4.16, 4.28
See application file for complete search history.

(56) References Cited

U.S. PATENT DOCUMENTS

| | | | |
|---|---|---|---|
| 2,936,861 A | | 5/1960 | Richardson |
| 2,997,278 A | * | 8/1961 | Pinson .................... F16B 2/245 256/47 |
| 3,304,683 A | * | 2/1967 | Ferreira .................... E04B 2/58 256/24 |
| 3,339,750 A | | 9/1967 | Nelson-Hawkins |
| 3,511,004 A | | 5/1970 | Snellings |
| 3,688,635 A | * | 9/1972 | Fegen ................... F16B 21/082 174/138 A |
| 3,833,199 A | | 9/1974 | Frake |
| 3,945,602 A | | 3/1976 | Doubleday et al. |
| 4,473,209 A | | 9/1984 | Gallis et al. |
| 4,765,775 A | | 8/1988 | Kroger |

(Continued)

*Primary Examiner* — Andrew T Kirsch
(74) *Attorney, Agent, or Firm* — Daniel J. Polglaze; Westman, Champlin & Koehler, P.A.

(57) ABSTRACT

Containment systems and methods for assembling containment systems include a plurality of posts supporting panels, the posts having top and bottom connectors to connect posts to panels. The tank may be assembled without tools using tabs on the connectors and slots in the panels, with at least one connector having a tab that is bent down after insertion into a slot to secure a panel to a post.

14 Claims, 5 Drawing Sheets

(56) References Cited

U.S. PATENT DOCUMENTS

| | | | |
|---|---|---|---|
| 5,178,369 A * | 1/1993 | Syx | A01G 1/08 256/1 |
| 5,964,548 A | 10/1999 | Akins et al. | |
| 6,477,721 B2 * | 11/2002 | Lee | 4/506 |
| 6,884,002 B1 | 4/2005 | Fuller | |
| 7,014,391 B2 | 3/2006 | Starheim et al. | |
| 8,540,456 B2 | 9/2013 | Marshall | |
| 2006/0255325 A1 * | 11/2006 | Lo | E04H 17/1421 256/59 |
| 2013/0140304 A1 | 6/2013 | Mackie | |

* cited by examiner

BOLTLESS CONTAINMENT

FIELD

The present disclosure relates generally to a panelized containment systems and in particular the present disclosure relates to components for assembly and assembly of a containment system for tanks.

BACKGROUND

Large panelized containment systems are used to surround tanks, such as agricultural and oil field tanks, and to contain a leak from a tank or tanks that are located within the containment system. Such containment systems can have large stresses applied thereto when assembled. Typical connectors for panels of containment systems use a bolted connection system in which bolts are attached to and extend from panels, and a separate plate that has openings fitting over the bolt holes.

Panels in containment systems are commonly assembled in many different conditions, such as in extreme temperatures both high and low, and in locations where the use of advanced tools may be hampered by a lack of electricity, availability, and the like. Further, panels for containment systems, such as those described above, typically require the use of small pieces such as nuts and bolts. In cold temperatures especially, the use of nuts and bolts becomes difficult since gloves are often necessary. In cold temperatures, without gloves or other hand protection, manual dexterity, such as that used for working with small parts or tools requiring adjustment (wrenches and the like), is reduced as hands get colder. Further, in cold weather situations, where there may be snow or ice on the ground, if a small part is dropped, it may not be easily retrieved.

For the reasons stated above, and for other reasons stated below which will become apparent to those skilled in the art upon reading and understanding the present specification, there is a need in the art for an improved containment system assembly method including post and panel connectors.

DETAILED DESCRIPTION

Figure 1:
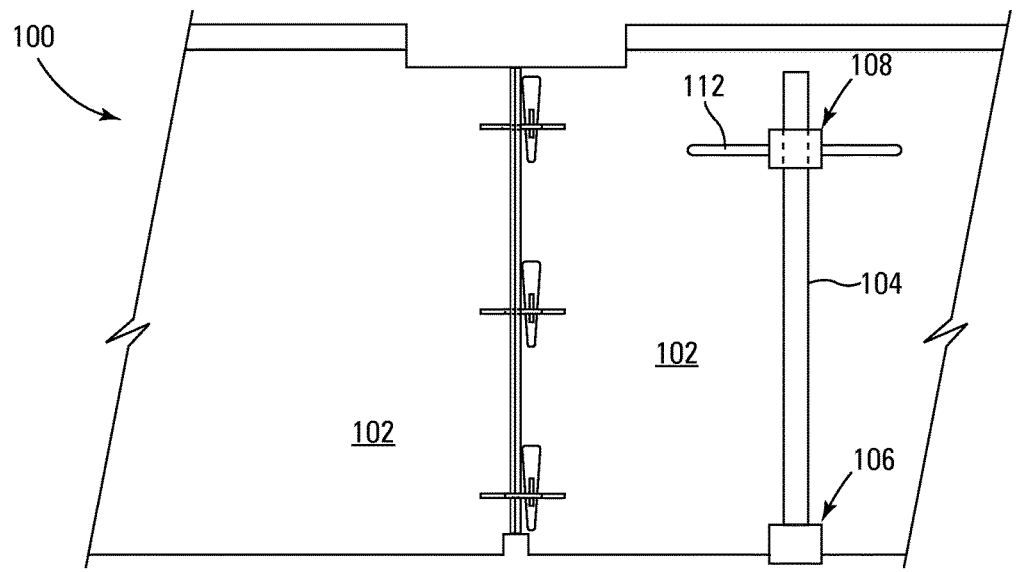
FIG. 1 is an elevation view of an exterior portion of a tank containment system according to an embodiment of the present disclosure.

In the following detailed description of the embodiments, reference is made to the accompanying drawings that form a part hereof. In the drawings, like numerals describe substantially similar components throughout the several views. These embodiments are described in sufficient detail to enable those skilled in the art to practice the invention. Other embodiments may be utilized and structural changes may be made without departing from the scope of the present invention.

The following detailed description is, therefore, not to be taken in a limiting sense, and the scope of the present disclosure is defined only by the appended claims, along with the full scope of equivalents to which such claims are entitled.

Figure 2:
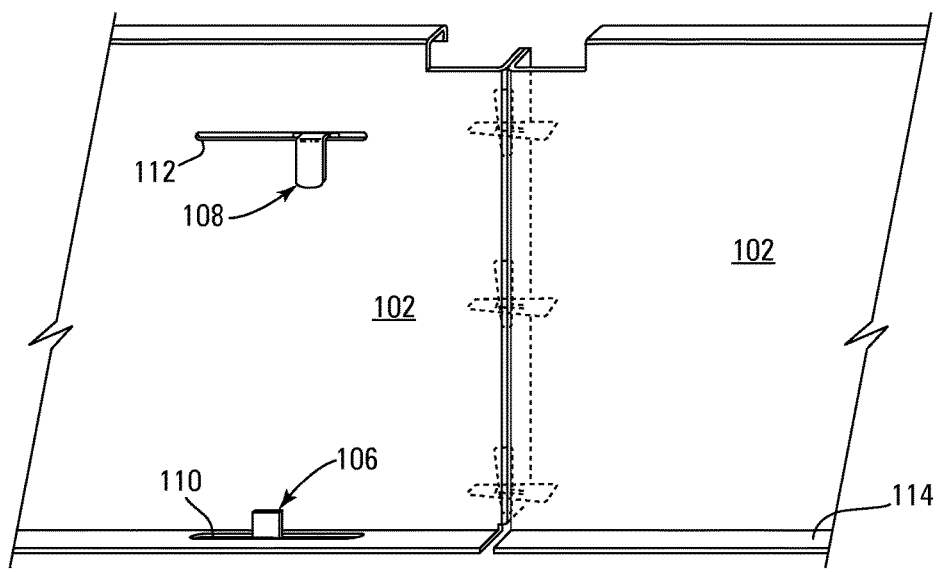
FIG. 2 is an elevation view of an interior portion of the containment system of FIG. 1.

FIG. 1 is a perspective view of a portion of an outside of a tank containment system 100 according to one embodiment of the present disclosure. Containment system 100 comprises in one embodiment panels 102 that are attached to upright posts 104 using connectors. In this embodiment, a bottom connector 106 and a top connector 108 are used. Referring also to FIG. 2, in which a reverse side of the panels 102 of the containment system are shown, panels 102 have a plurality of slots 110 to fit a tab of a bottom connector 106 and a plurality of slots 112 to fit a tab of a top connector 108. The tabs on the connectors are in one embodiment metal, such as steel.

In one embodiment, slots 110 are located in a flange 114 on a bottom of a panel 102, the flange at substantially the ground level. A tab of the bottom connector 106 extends into the slot 110 to assist in the positioning of the panel 102 as a part of the tank 100. The bottom connector 106 is shown in greater detail in FIGS. 3 and 4.

In one embodiment, slots 112 are located in a vertical wall of panel 102. A tab of the top connector 108 fits into and through the slot 112. To secure the panel 102 to the post 104, the tab of the top connector 108 is bent down, such as with a hammer or other tool. The top connector 108 is shown in greater detail in FIGS. 5 and 6.

Figure 3:
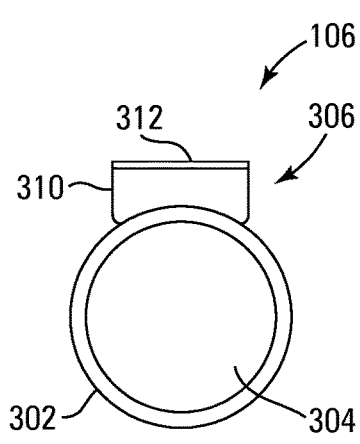
FIG. 3 is a top view of a bottom connector according to an embodiment of the present disclosure.
Figure 4:
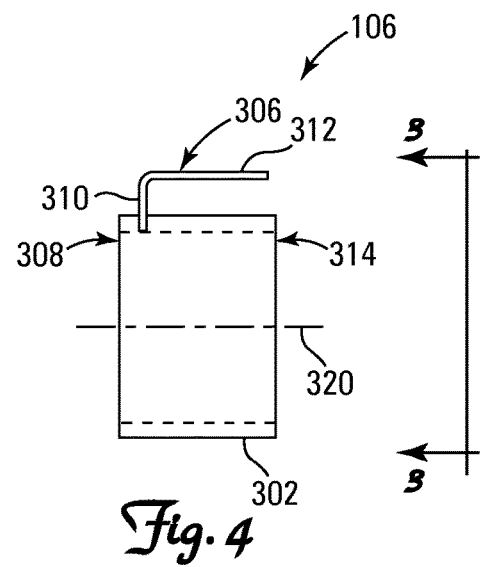
FIG. 4 is a side elevation view of the bottom connector of FIG. 3.

FIGS. 3 and 4 are top and side elevation views, respectively, of a bottom connector such as bottom connector 106 described above. Bottom connector 106 in one embodiment comprises a cylindrical portion 302 defining an opening 304 therethrough. The opening 304 in one embodiment has an inner diameter sized to slidably accommodate a post such as post 104. A tab 306 extends from the cylindrical portion 302 near a bottom 308 of the bottom connector 106. Tab 306 includes in one embodiment a first tab portion 310 proximate to the cylindrical portion 302 and substantially perpendicular to a longitudinal axis 320 of the cylindrical portion 302, and a second tab portion 312 distal to the cylindrical portion 302, the second tab portion 312 bent approximately 90 degrees to the first tab portion 310, and extending toward an end 314 of the bottom connector and substantially parallel to the longitudinal axis 320. In one embodiment, end 314 is a top of the bottom connector.

Figures 5, 6:
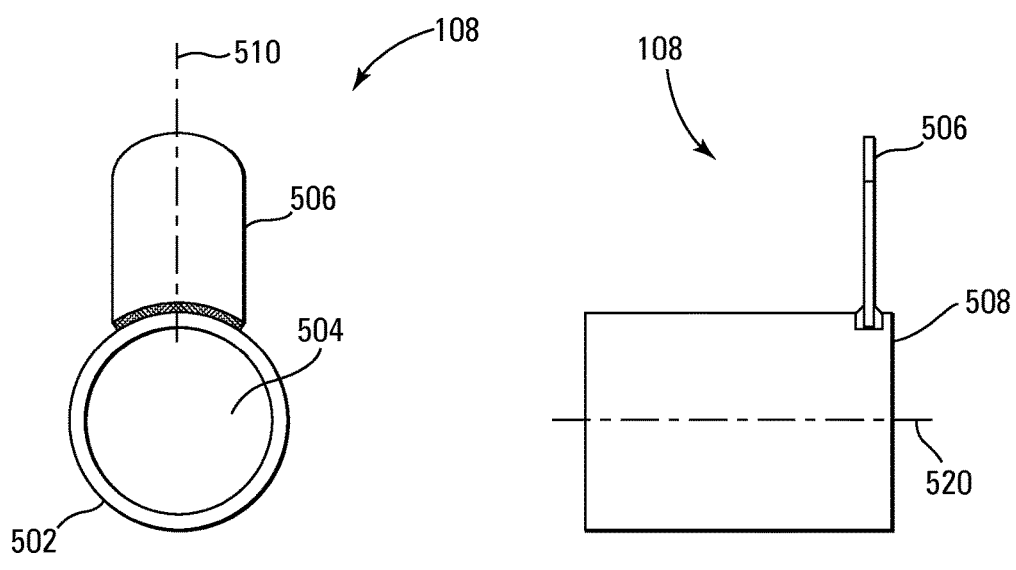
FIG. 5 is a top view of a top connector according to an embodiment of the present disclosure.
FIG. 6 is a side elevation view of the top connector of FIG. 5.

FIGS. 5 and 6 are top and side elevation views, respectively, of a top connector such as top connector 108 described above. Top connector 108 in one embodiment comprises a cylindrical portion 502 defining an opening 504 therethrough. The opening 504 in one embodiment has an inner diameter sized to slidably accommodate a post such as post 104. A tab 506 extends from the cylindrical portion 502 near an end 508 of the top connector 108. Tab 506 is in one embodiment disposed substantially perpendicularly to a longitudinal axis 520 of the cylindrical portion 502. In one embodiment, tab 506 has a distal end 510 that is rounded, although other end shapes may be substituted without departing from the scope of the disclosure.

Referring also to FIG. 1, a containment system 100 according to one embodiment comprises a plurality of posts 104 arranged in a perimeter tank pattern, a plurality of panels 102 forming a containment perimeter, each panel 102 having a top connector slot 112 therein, and a bottom flange 114 with a bottom connector slot 110 therein. A plurality of connectors, a top connector 108 and a bottom connector 110 are slidably engaged with each post 104, and each connector has a tab extending therefrom to engage the top connector slot 112 and the bottom connector slot 110, respectively, of a panel 102.

Figure 7:
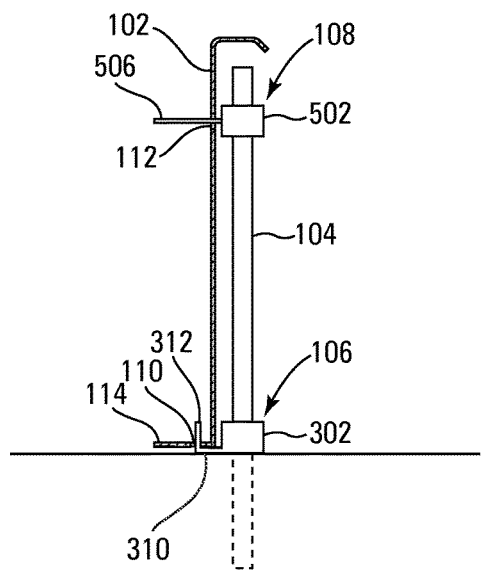
FIG. 7 is a side view of a panel and post with connectors in an unsecured position.
Figure 8:
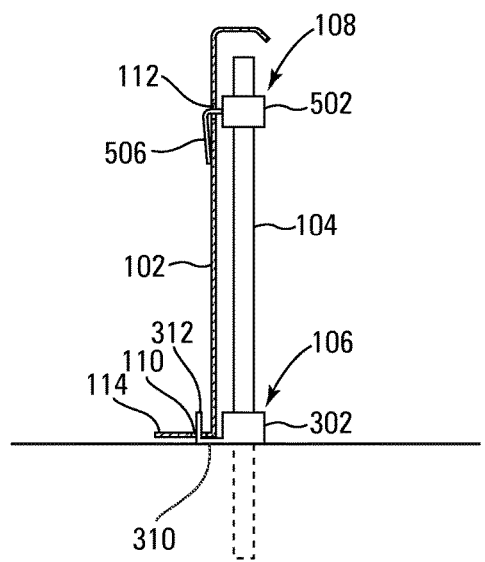
FIG. 8 is a side view of the panel and post with connectors of FIG. 7, with the top connector in an secured position.

Referring now also to FIGS. 7 and 8, a side view of a containment system assembly of a panel to a post with the connectors is shown. FIG. 7 shows a side view of a panel 102 in place on a post 104, with lower connector 302 having its tab portion 312 extending into the flange slot 110, and upper connector 108 having its tab 506 extending into the panel slot 112. In FIG. 7, the tab 506 has not been bent to secure the panel 102 to the post 104. FIG. 8 shows the tank view of FIG. 7, with the tab 506 having been bent down against the panel wall to secure the panel 102 to the post 104.

Figure 9:
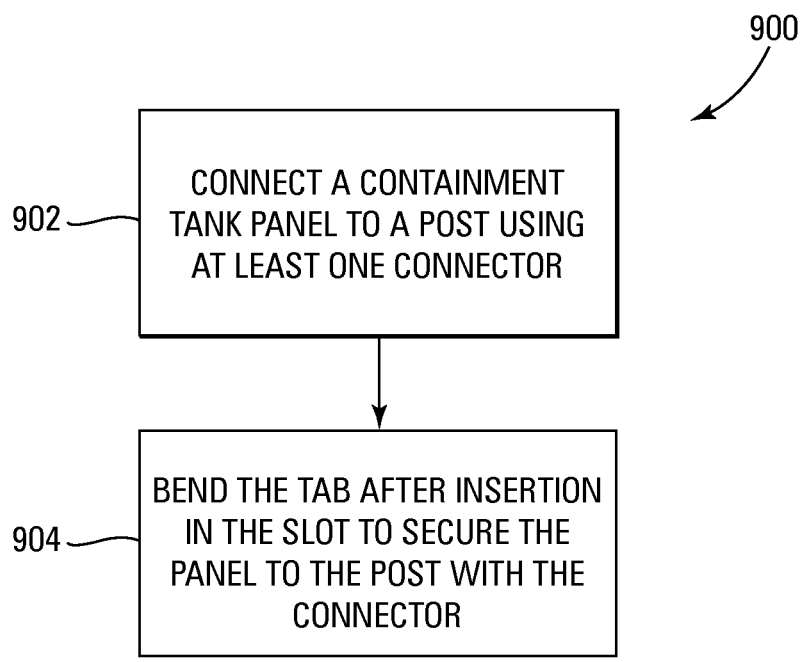
FIG. 9 is a flow chart diagram of a method according to an embodiment of the present disclosure.

A method 900 of assembling a containment system such as containment system 100 is shown in flow chart form in FIG. 9. Method 900 comprises, in one embodiment, connecting a containment system panel to a post using at least one connector in block 902, and bending a tab on the at least one connector after insertion in a slot to secure the panel to the post with the connector in block 904. The tab is typically bent down. The tab is designed in one embodiment to be strong enough to hold against pressure, but still able to be bent with a hammer or the like.

In one embodiment, the at least one connector is slidably mounted on the post, and the tab extends into a slot on the panel. Connecting in one embodiment further comprises using at least one second connector, the at least one second connector also slidably mounted on the post, and having a fixed tab extending vertically through a bottom tab slot on a bottom flange of the panel. The second connector, such as bottom connector 106 described above, is slid onto the post first, and the first connector, such as top connector 108 described above, is slid onto the post second. Then, a panel is lowered onto the tab portion, such as tab portion 312, via a flange slot, such as slot 110. Once the panel is in place on the bottom connector, the top connector may be rotated to insert its tab (506) into the panel slot (112). Following this, the tab is bent against the panel to secure the panel to the post.

In one embodiment, panel connectors are used to connect one panel 102 to another panel 102, also without the use of bolts. Such connectors are known in the art, and are not described further herein.

While one post, bottom connector, and top connector are shown and described, it should be understood that each panel typically has more than one post and set of connectors, and the number of posts and connectors per panel may be increased without departing from the scope of the disclosure.

Post 104 is shown as a round post in the Figures, and the openings in the connectors 106 and 108 are shown as cylindrical. Round posts and cylindrical openings serve in one embodiment to make it easy to place the connectors on the posts, such as in severe conditions like cold, rain, snow, and the like. Round posts and cylindrical openings also allow for higher tolerances of placement of the connectors, so that if a panel is slightly warped, or if the post is not aligned closely with the panel orientation, the connector may be easily rotated to place the tab in the slot. However, it should be understood that different cross-sectional shapes may be used for the posts and connector openings without departing from the scope of the disclosure.

CONCLUSION

A containment system and connectors and methods for assembly have been shown. One method includes assembling a plurality of posts supporting panels, the posts having top and bottom connectors to connect posts to panels. The tank may be assembled without tools using tabs on the connectors and slots in the panels, with at least one connector having a tab that is bent down after insertion into a slot to secure a panel to a post.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A tank containment system, comprising:
    a plurality of posts arranged in a perimeter tank pattern;
    a plurality of panels forming a tank perimeter, each panel having a face with a top connector slot extending completely through a thickness of the panel from a first exterior side of the panel to a second, opposite interior side of the panel, and a bottom flange extending substantially perpendicular to the face of the panel, the bottom flange having a bottom connector slot extending completely therethrough;
    a plurality of connectors including a top and a bottom connector slidably engaged with each post, and each of the plurality of connectors having a cylindrical body having an interior opening therethrough to slide the connector around the post to surround an entire post circumference, and a tab extending from an exterior of its cylindrical body to extend fully through its respective top connector slot or bottom connector slot of a panel of the plurality of panels;
    wherein each top connector tab extends from the exterior of its cylindrical body, substantially perpendicular to a longitudinal axis of the cylindrical body, wherein the tab is bendable; and
    wherein each bottom connector tab extends from the exterior of its cylindrical body, with a first portion proximal to the cylindrical body and extending substantially perpendicular to a longitudinal axis of the cylindrical body, and a second portion distal to the cylindrical body and extending substantially perpendicularly from the first portion, the second portion configured to extend through the bottom connector slot substantially perpendicular to the top connector tab.

2. The tank containment system of claim 1, wherein the bottom connector tab distal portion extends substantially vertically into the bottom connector slot to secure the panel to the post.

3. The tank containment system of claim 1, wherein the top connector tab extends through the top connector slot and is bent down to secure the panel to the post.

4. The tank containment system of claim 1, wherein the bottom connector tab engages the bottom connector slot to secure the panel to the post.

5. The tank containment system of claim 4, wherein the bottom connector tab distal portion extends substantially vertically into the bottom connector slot to secure the panel to the post.

6. The tank containment system of claim 1, wherein the top connector slot and the bottom connector slot are disposed away from an end of the panel.

7. The tank containment system of claim 1, wherein each of the top connector and the bottom connector tabs extend only from the exterior of the cylindrical body.

8. The tank containment system of claim 1, wherein each panel has a top flange substantially perpendicular to the face.

9. The tank containment system of claim 8, wherein the top flange and the bottom flange extend in opposite directions from the face.

10. The tank containment system of claim 1, wherein each connector cylindrical body has an interior diameter larger than an exterior diameter of the plurality of posts, and wherein each connector is slidably movable along the exterior diameter of its respective post.

11. A method of assembling a containment system, comprising:
connecting a containment panel to a post using at least one connector, the at least one connector slidably mounted around the post to surround an entire circumference of the post, and having a tab that extends from an exterior of the connector fully through a slot extending completely through a thickness of the panel from a first exterior side of the panel to a second opposite interior side of the panel;
bending the tab after insertion through the slot to secure the panel to the post with the connector; and
connecting the containment panel to the post using at least one second connector, the at least one second connector slidably mounted around the post to surround an entire circumference of the post, and having a bottom connector tab comprising a first portion extending from an exterior of the connector, and a second portion extending from the first portion vertically and substantially perpendicular to the first portion, wherein connecting further comprises inserting the bottom connector tab through a bottom tab slot on a bottom flange of the panel, the bottom flange of the panel substantially perpendicular to the exterior and interior sides of the panel.

12. A method of assembling a containment system, comprising:
placing a plurality of posts arranged in a perimeter tank pattern;
arranging a plurality of panels forming a tank perimeter at the tank perimeter pattern, each panel having a face with a top connector slot extending completely through a thickness of the panel from a first exterior side of the panel to a second opposite interior side of the panel, and a bottom flange extending substantially perpendicular to the face of the panel with a bottom connector slot therethrough from a first side of the bottom flange to an opposite side of the bottom flange; and
connecting the plurality of panels to the plurality of posts using a plurality of connectors including a top and a bottom connector each slidably engaged to surround each respective post, and each top connector and bottom connector having a tab extending through the top connector slot and the bottom connector slot, respectively, of a panel of the plurality of panels;
connecting each containment panel to each bottom connector, each bottom connector slidably mounted around the post to surround an entire circumference of the post, and having a bottom connector tab comprising a first portion extending from an exterior of the connector, and a second portion extending from the first portion vertically and substantially perpendicular to the first portion, wherein connecting further comprises inserting the bottom connector tab through a bottom tab slot on a bottom flange of the panel, the bottom flange of the panel substantially perpendicular to the exterior and interior sides of the panel.

13. The method of claim 12, wherein connecting further comprises inserting a tab of each bottom connector substantially vertically into a bottom connector slot of a panel of the plurality of panels.

14. The method of claim 12, wherein connecting further comprises bending a tab of each top connector to secure its post to its panel.

* * * * *